United States Patent [19]
Durrani et al.

[11] Patent Number: 6,011,542
[45] Date of Patent: Jan. 4, 2000

[54] GRAPHICAL TEXT ENTRY WHEEL

[75] Inventors: Sulaiman Durrani, San Diego; Clay Karmel, San Jose, both of Calif.

[73] Assignees: Sony Corporation, Tokyo, Japan; Sony Electronics, Inc., Park Ridge, N.J.

[21] Appl. No.: 09/023,796

[22] Filed: Feb. 13, 1998

[51] Int. Cl.[7] ........................................... G09G 5/34
[52] U.S. Cl. ............................... 345/156; 345/126
[58] Field of Search .................... 345/156, 164, 345/169, 171, 172, 326, 339, 333–334, 340, 348–349, 356, 113, 121, 124, 125, 126, 133, 141

[56] References Cited

U.S. PATENT DOCUMENTS

| | | | |
|---|---|---|---|
| 5,477,240 | 12/1995 | Huebner et al. | 345/124 |
| 5,495,267 | 2/1996 | Fujitaka | 345/123 |
| 5,734,875 | 3/1998 | Cheng | 395/516 |
| 5,749,082 | 5/1998 | Sasaki | 707/508 |
| 5,757,353 | 5/1998 | Yokota et al. | 345/123 |
| 5,812,117 | 9/1998 | Moon | 345/169 |
| 5,854,641 | 12/1998 | Howard et al. | 345/517 |
| 5,887,197 | 3/1999 | Isomura | 395/875 |
| 5,889,893 | 3/1999 | Robson | 382/296 |

OTHER PUBLICATIONS

Simpson, *Mastering Word Perfect ®5–1 & 5–2 for Windows™*, Sybex, Inc, Alameda, CA.,1993.

*Primary Examiner*—Steven P. Sax
*Attorney, Agent, or Firm*—Frommer Lawrence & Haug, LLP.; William S. Frommer

[57] ABSTRACT

In accordance with the invention, a graphical text entry system is provided. The graphical text entry system includes a graphical text entry screen, preferably on a small electronic device, and a graphical text entry wheel displayed on the graphical text entry screen. A plurality of characters are positioned on the graphical text entry wheel. The system also includes a pointing device for rotating the graphical text entry wheel to allow a user to select one of the characters on the graphical text entry wheel to be entered. After selection of one or more characters, the graphical text entry system may provide suggested next characters or words to aid in text entry. A method for entering text into an electronic device using the graphical text entry system of the invention is also provided.

29 Claims, 4 Drawing Sheets

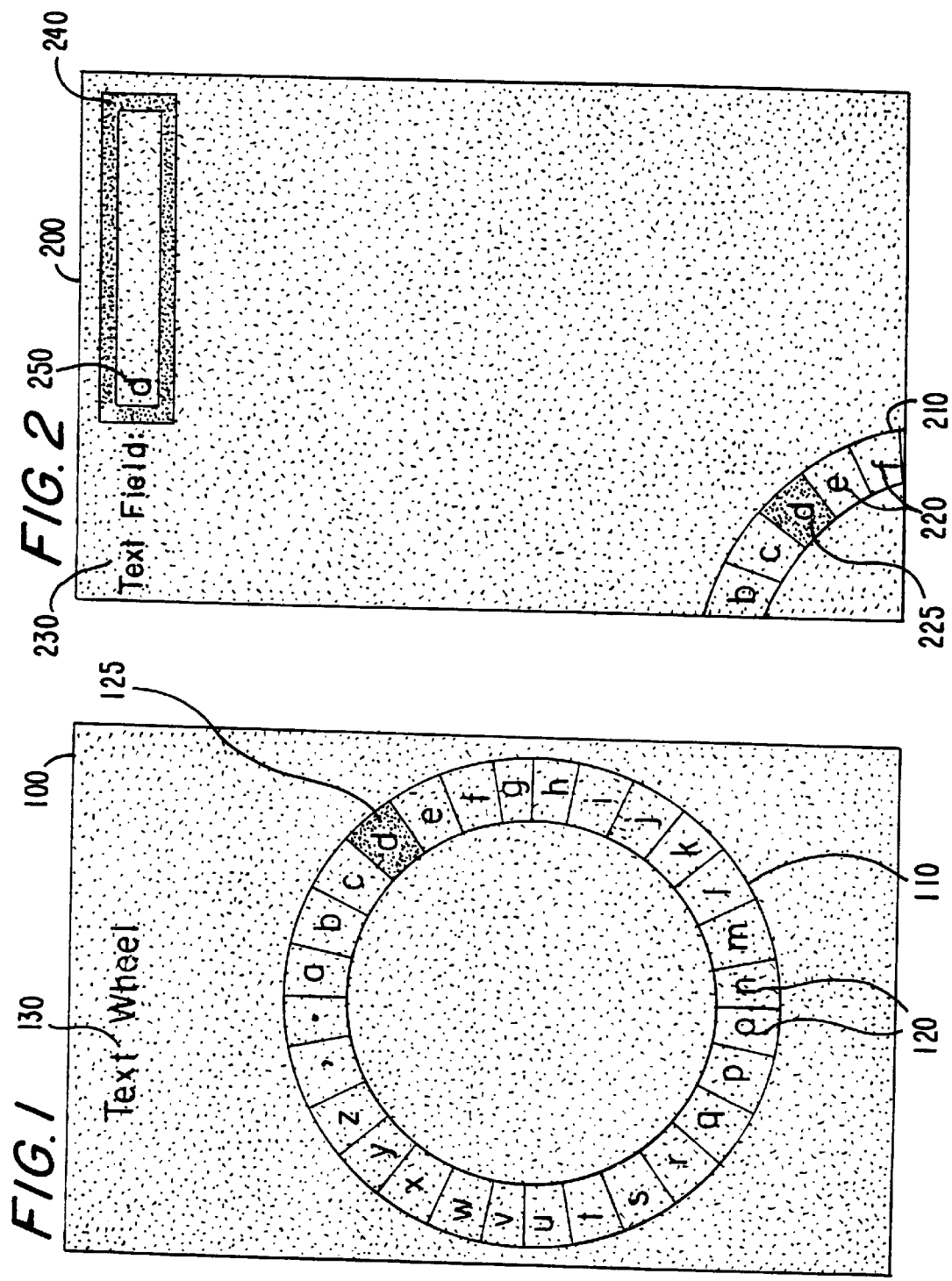

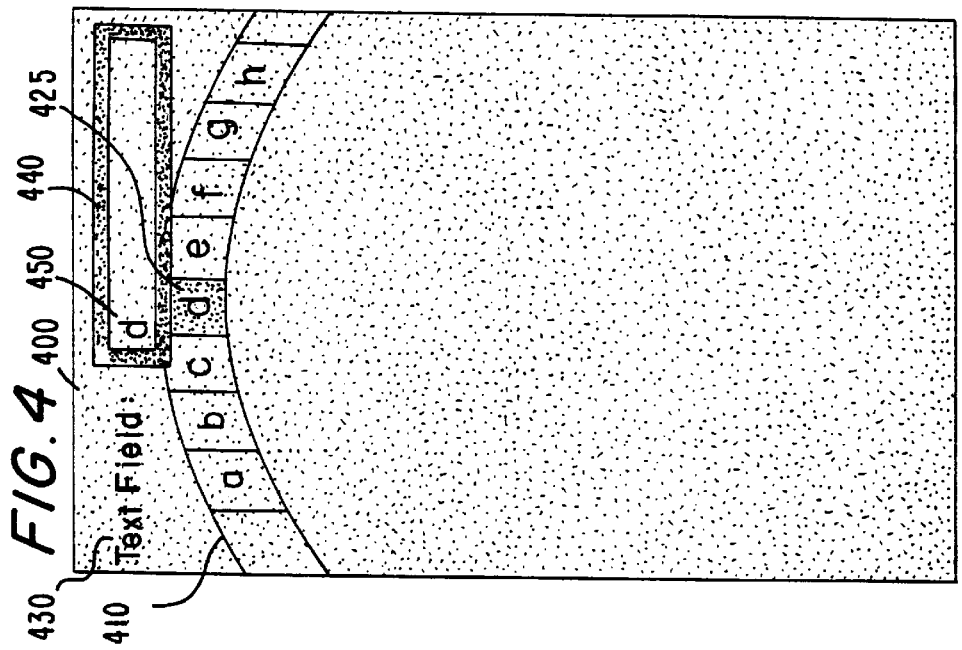
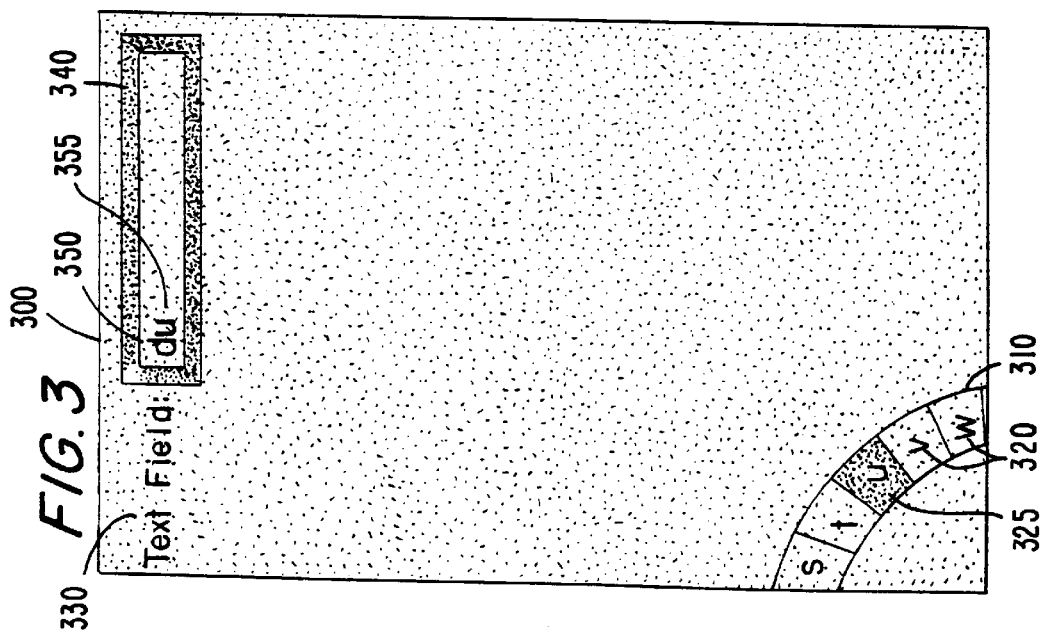

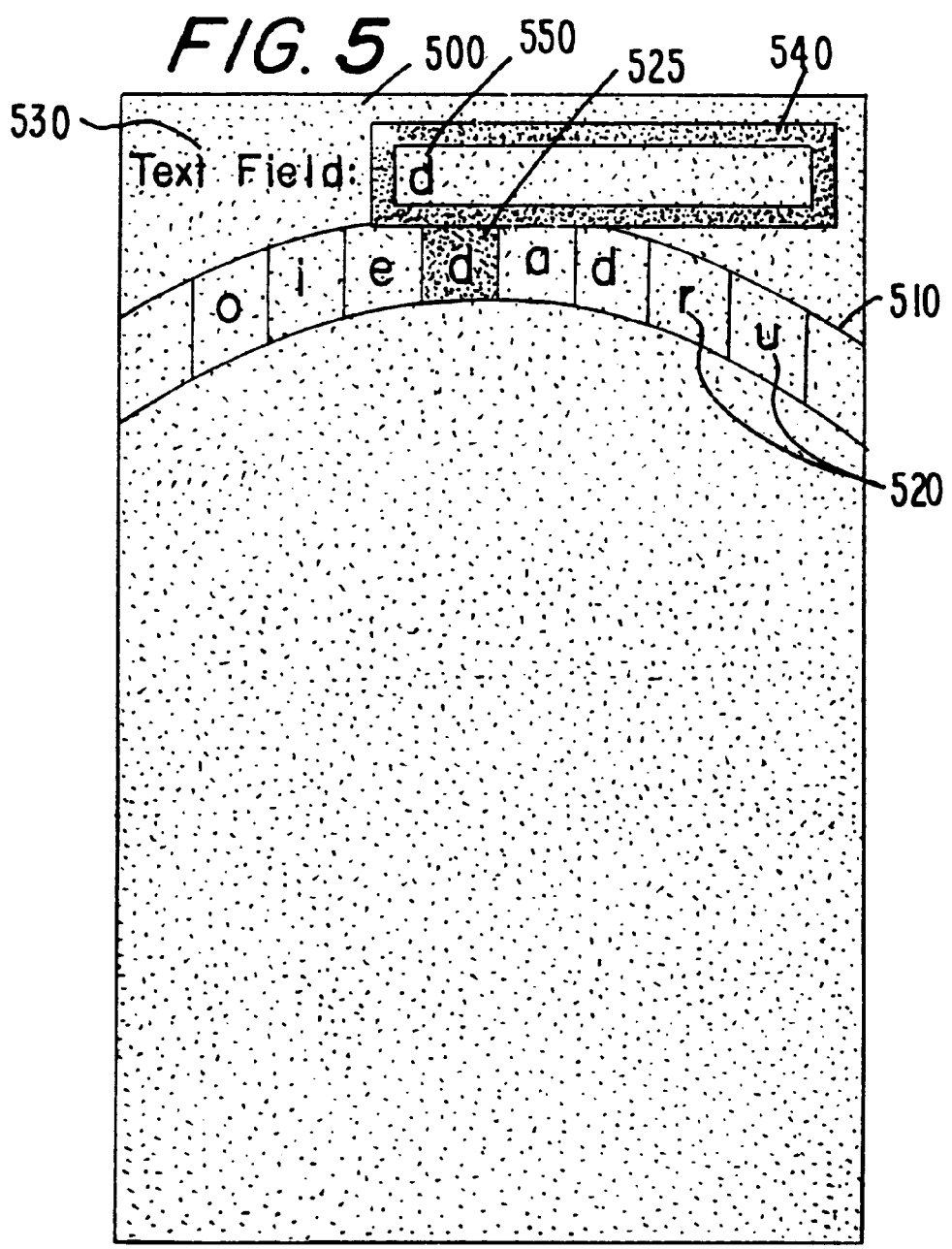

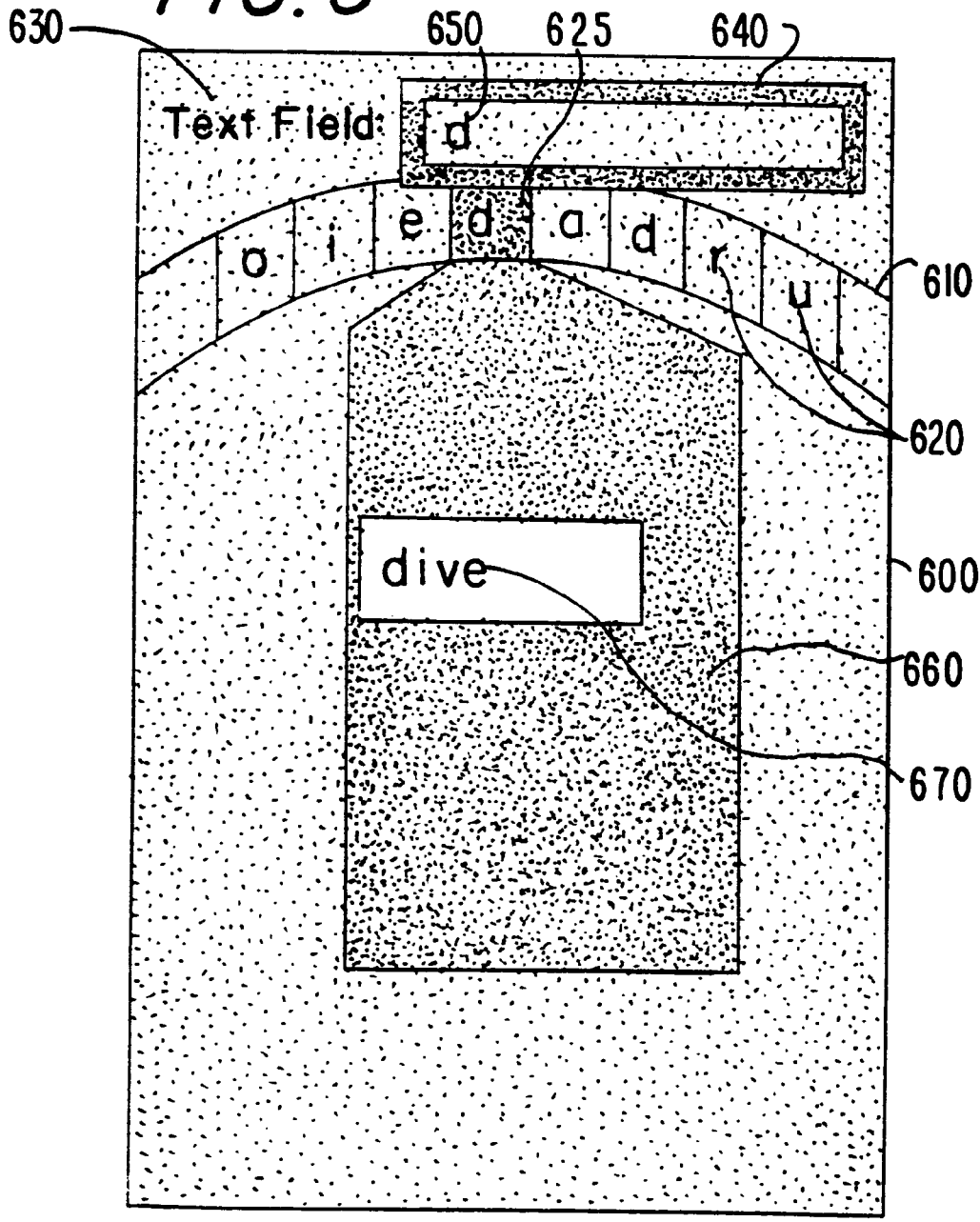

GRAPHICAL TEXT ENTRY WHEEL

BACKGROUND OF THE INVENTION

This invention relates generally to an apparatus and method for entering text on a small, portable, hand held consumer device, and more particularly to a graphical text entry wheel for allowing entry of data on a small, portable, hand held consumer device.

Recently, a proliferation in the number of hand held computer devices, including appointment books, personal communication devices, and laptop personal computers, to name a few, has occurred. With the progression of technology, it has become necessary to provide these devices with increased power, increased options, such as modems, e-mail, facsimile communication and the like, while greatly reducing the size of these apparatuses. However, this reduction in size has resulted in an additional problem, namely, data entry to these reduced size devices is often very difficult.

In order to allow the user to input data while still maintain a reduced overall size of the apparatus, a keyboard for data entry has been provided which is implemented as a graphic on an LCD display. Thus, the LCD display displays a keyboard, such as would be available in a regular computer or typewriter, and the user touches each of the LCD-displayed keys to enter data. However, even these keyboards may be insufficient since if the apparatus is small enough, the keyboard keys are so small so as to be difficult to use by the user. Additionally, if the graphical display is too small, such a keyboard will not function properly.

In order to remedy this problem, recent innovations have been proposed which allow the entry of data into the portable device using a pen or the like, the apparatus simply recording material written by user. While this method is improved, it is still necessary for the user to use two hands to enter the data, one hand to hold the apparatus and one hand to write on the screen. Additionally, the apparatus must interpret the handwriting into a computer readable format, and the procedure for doing so is time consuming and is also less than 100% accurate. Furthermore, the variety of characters which may be entered may be limited based on the ability of the apparatus to discern between various handwritten material.

Therefore, it would be beneficial to provide a text entry system for a small, hand held computer device in which text can be entered using only one hand in a quick and easy manner, and which provides a full range of characters which may be entered by the user.

OBJECTS OF THE INVENTION

Accordingly, it is an object of this invention to provide an improved text entry system for a small consumer product.

Another object of the invention is to provide an improved text entry system for entering text on a graphical screen on a small consumer product.

A further object of the invention is to provide an improved text entry system for entering text on a graphical interface of a small consumer product in which the material can be entered using only one hand of the user.

A still further object of the invention is to provide an improved text entry system for a small consumer product whereby text is entered on a graphical wheel depicted on a graphical interface on a small consumer product.

Yet another object of the invention is to provide an improved text entry system for a small consumer product including a graphical text entry wheel which allows for the entry of any number of different characters by a user.

Still other objects and advantages of the invention will in part be obvious and in part be apparent from the specification and the drawings.

SUMMARY OF THE INVENTION

Generally speaking, in accordance with the invention, a small consumer product having a graphical text entry wheel is provided for allowing entry of text into the small consumer product. The graphical text entry wheel is pictured on the graphical interface screen of the small consumer product. Using a small button, joystick or other pointing device on the side of the object, which may be accessed by a user's hand while holding the small consumer product in that same hand, the graphical text entry wheel may be rotated by the user to advance the wheel to a particular desired character. The user may also enter a particular text character by performing a further predetermined operation with the button, joystick or the like. In accordance with the invention, either the entire graphical text entry wheel is depicted, or merely a portion thereof in any portion of the graphical text entry interface screen, as selected by the user.

In a further aspect of the invention, a mode is provided in which the graphical text entry wheel recognizes a first, or subsequent character entered by the user, and thereafter makes suggestions of words which the user may be attempting to enter. Thus, the user can select the remainder of the word rather than enter each letter for the entire word. Furthermore, the graphical text entry wheel of the invention is adapted to recognize a particular letter which has been entered by the user, and thereafter rearrange the characters contained on the graphical text entry wheel pictured in the small consumer device to place more likely next characters adjacent the previously entered character, so that the user need not rotate completely around the wheel to select each of the subsequent characters.

In another aspect of the invention, the user may perform a further function with the button, joystick or the like, in order to shuffle through various graphical text entry wheels, thereby allowing for the entry of any number of characters. Each set of characters preferably is contained on a different wheel, allowing the user to view and use these character sets as desired.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the invention will be indicated in the claims.

BRIEF DESCRIPTION OF THE DRAWINGS

For a more complete understanding of the invention, reference is made to the following description and accompanying drawings, in which:

FIG. 1 is a top plan view of a graphical text entry wheel constructed in accordance with the invention and depicting an entire text wheel;

FIG. 2 is a top plan view of a graphical text entry wheel constructed in accordance with the invention depicting a portion of the text wheel and a character being selected;

FIG. 3 is a top plan view of a graphical text entry wheel constructed in accordance with the invention depicting a portion of the text wheel, and the selection of a second character;

FIG. 4. is a top plan view of a graphical text entry wheel depicting a portion of the graphical text wheel in a format different from that FIGS. 2 and 3, and selection of a character and the adjacent characters;

FIG. 5 is a top plan view of a graphical text entry wheel depicting the characters adjacent a selected character in an alternative format; and FIG. 6 is a top plan view of a graphical text entry wheel in which a selected letter generates suggested words.

DETAILED DESCRIPTION OF PREFERRED EMBODIMENTS

Referring first to FIG. 1, a graphical interface screen 100 constructed in accordance with the invention is depicted. Within graphical interface screen 100 is displayed a graphical text entry wheel 110 having a plurality of characters 120 positioned therein. A darkened portion 125 of graphical text wheel 110 depicts a selected character. Also shown on graphical text entry screen 100 is a text designation 130 for recording the material entered into the graphical text entry system by a user, or to display additional information to the user.

While text screen 100 in FIG. 1 displays the entire graphical text entry wheel 110, this wheel takes up a large portion of the screen, therefore not allowing for the display of much additional information 130. Thus, as is shown in FIG. 2, in accordance with an alternative embodiment of the invention, a graphical text entry wheel 210 is displayed in the corner of a graphical interface screen 200, depicting only a portion of graphical text entry wheel 210. Similarly to FIG. 1, graphical text entry wheel 210 comprises a plurality of characters 220 and a darkened portion 225 indicating a selected character. In FIG. 2, a text designation field 230 is used to generate a message indicating that certain characters are either being selected, or have already been selected by a user. Specifically, a border 240 surrounds an entry portion which displays the characters selected by a user from graphical text entry wheel 210. Upon selection of one of the plurality of the characters 220 by moving the darkened portion 225 thereon, this selected character is depicted within border 240 as character 250.

Referring additionally to FIG. 3, text screen 300 displays a portion of graphical text entry wheel 310 having a plurality of characters 320 and a selected character 325, similar to the apparatus of FIG. 2. As is shown, a text field designation 330 precedes a border 340 surrounding a previously selected character 350, and a currently selected character 355. Thus, a user is able to rotate graphical text entry wheel 310 in order to make a second character selection. In this manner, it is possible for a user to select any number of desired characters.

In order to select a particular character, a user may utilize a track ball, joystick or other selection device (not shown). This selection device is movable in a first direction which rotates the graphical text wheel in a first direction and a second direction which rotates the graphical text entry wheel in a second direction. Thus, by manipulation of the direction of the text wheel, it is possible to arrive at any desired character within the current text wheel, and thereafter to select this character.

The selection device will typically be the same device as that used for movement of a cursor about the graphical text entry screen as during modes of operation which do not employ the graphical text entry wheel, such as the features of retrieving phone numbers, reviewing notes or appointments or performing other personal organization functions.

In order to enter the graphical test wheel entry mode, the user moves the cursor to the graphical text entry wheel, and then perform a specific operation with the mouse, joystick or the like. The mouse, joystick or the like will operate the graphical text entry wheel as noted above, rather than move the cursor about the screen. An additional defined function allows the user to exit the graphical text entry mode and return to the movement of the cursor about the screen.

The graphical text entry system of the invention is further provided with a plurality of graphical text entry wheels 310. Specifically, through the manipulation of the mouse, track ball, joystick or the like in a third direction (which may be a push button, or other direction) the user may shuffle through any number of text wheels which are maintained in memory. In an alternative embodiment, any additional predetermined functions which are to be performed by the same mouse, track ball, joystick or the like which is used to rotate the graphical text entry wheel may be performed on an additional mouse, track ball, joystick or the like, if provided. By way of example, while the default wheel may depict the alphabet, other text wheels may depict numbers and mathematical operators, or any other set of special characters required by a user. After shuffling through all of the possible text wheels and arriving at a desired text wheel, it is then possible to manipulate the mouse, track ball, joystick or the like as noted above with respect to the first text wheel in order to rotate the current text wheel to arrive at a desired character for selection. In this manner, the user may select one of any number of characters from any number of text wheels, and still maintain single hand operation.

As is further shown in FIG. 4, it is not necessary to place the graphical text entry wheel in the bottom left hand corner of the graphical text entry screen. Specifically, in FIG. 4, graphical text entry screen 400 is shown with a portion of graphical text entry wheel 410 positioned adjacent a top edge thereof. By depicting only a portion of graphical text entry wheel 410, more of graphical text entry screen 400 is available to display other characters or information. Graphical text entry wheel 410 is further shown with a plurality of characters 420 and character selection indicator 425; and is further positioned adjacent a message in text field designation 430, comprising outline 440 and selected character 450. The operation of graphical text entry wheel 410 is similar to that shown in FIGS. 2 and 3.

In accordance with the invention, it is possible provide a number of differing operation modes. Each of these operation modes will be described making specific reference to FIG. 4, 5 and 6.

Referring once again to FIG. 4, upon the movement of character selection indicator 425 to a particular character, and the selection of this character so that it appears as selected character 450 within outline 440, in a first mode of the invention, no alteration is made to the characters adjacent the selected character. Thus, as is shown in FIG. 4, the characters remain in alphabetical order after the selection of a first character, which is the same order in which they were present before the selection of the first character.

Referring next to FIG. 5, a graphical text entry screen 500 is provided with a graphical text entry wheel 510, a plurality of characters 520, a character selection indication 525, a text field designation 530, an outline 540 and selected character 550. As is shown, upon the movement of graphical text entry wheel 510, to move a desired character of the plurality of characters 520 to character selection indicator 525, and the selection of a selected character 550, the characters contained within graphical text entry wheel 510 are altered from their alphabetical ordering shown in FIG. 4, to an order in which the computer places characters which it believes to be the most likely characters to be next chosen adjacent the previously selected character on the text wheel. The characters less likely to be chosen next on the text wheel are placed in a position further away from the selected character, and therefore not on the portion of the text wheel shown in FIG. 5. In this manner, it is likely to require less movement of the text wheel after the selection of a first letter to find the subsequent letters. However, if the progression of letters is uncommon, the user is still able to select any of the characters originally contained on graphical text entry wheel 510 through the movement and rotation of graphical text wheel 510, as noted above with respect to the graphical text wheels described in previous embodiments of the invention. Alternatively, after entry of the mode in which the letters are reorganized so that the most likely next characters are positioned adjacent the selected character, the user may reset the wheel to provide the characters back in the original order by a predefined function. In a preferred embodiment, this predefined function is rotating the wheel so that the selected character is removed from the screen.

Referring next to FIG. 6, a graphical text entry screen 600 constructed in accordance with an additional alternative embodiment of the invention is shown. Graphical text entry screen 600 is similarly provided with a graphical text entry wheel 610, having a plurality of characters 620, a character selection indicator 625, a text field designation 630, an outline 640 and a selected character 650. As with the embodiment depicted in FIG. 5, upon the selection of a selected character 650, the plurality of characters 620 within graphical text entry wheel 610 are adjusted by the apparatus so that the most likely next characters are positioned within graphical text wheel 610 adjacent the selected character.

Furthermore, in this embodiment, in addition to rearranging the characters, graphical text entry screen 600 provides a list of one or more suggested words which might be the word intended to be entered by the user. Thus, as is shown in FIG. 6, a suggested text window 660 is provided with at least one suggested character string, or word 670. By way of example, upon the selection of the letter "d", a list of selected possible words 670 is displayed within suggested text window 660. Thus, as is shown, the word "dive" is shown as a 1 potential word starting with the letter "d".

In accordance with this embodiment of the invention, it is possible to provide any number of words, either generated from a dictionary provided by the apparatus, or a dictionary provided by the user, so that the user need not enter all the letters of the words, but can select a word from the list. While the list is shown using only a first selected character to produce suggested words, the user may enter a second selected character, thereby narrowing the range of possible words which could be intended by that user. Graphical text entry screen 600 utilizes these two first selected characters, and displays only potential words that began with these two selected characters. In this manner, graphical text entry by a user is performed more easily, and more quickly.

It will thus be seen that the objects set forth above, among those made apparent from the preceding description, are efficiently attained and, since certain changes may be made in carrying out the above method and in the constructions set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed:

1. A graphical text entry system, comprising:
    a graphical text entry screen;
    a graphical text entry wheel displayed on said graphical text entry screen;
    a plurality of characters positioned on said graphical text entry wheel; and
    a pointing device for rotating said graphical text entry wheel, a character selection indicator positioned on said graphical text entry wheel, said pointing device selecting a particular character indicated by said characteor selection indicator,
    wherein said plurality of characters are arranged in a particular order on said graphical text entry wheel and said order is rearranged after one or more of said plurality of characters is selected to position most likely next characters to b selected in positions close to said one or more selected characters.

2. The system of claim 1, wherein said graphical text entry wheel is depicted in its entirety on said graphical text entry screen.

3. The system of claim 1, wherein only a portion of said graphical text entry wheel is depicted on said graphical text entry screen.

4. The system of claim 3, wherein said portion of said graphical text entry wheel is depicted in a lower corner of said graphical text entry screen.

5. The system of claim 3, wherein said portion of said graphical text entry wheel is depicted adjacent a top portion of said graphical text entry screen.

6. The system of claim 1, wherein said pointing device is operable to rotate said displayed graphical text input wheel.

7. The system of claim 6, further comprising a suggested text window displayed adjacent said graphical text entry wheel after one or more characters are selected, said suggested text window further comprising at least one suggested character string corresponding to said one or more selected characters.

8. The system of claim 1, further comprising a plurality of graphical text entry wheels; and wherein said pointing device is operable to perform another predetermined function to shuffle through said plurality of graphical text entry wheels.

9. The system of claim 8, wherein each of said plurality of graphical text entry wheels contains a different set of characters.

10. The system of claim 1, wherein said graphical text entry system is included in a hand held electronic device.

11. The system of claim 10, wherein said hand held electronic device is of a size sufficient to be held and said pointing device operated by a user with the same hand.

12. A method for entering text into an electronic device, comprising the steps of:
    displaying a graphical text entry wheel on a graphical text entry screen;
    positioning a plurality of characters on said graphical text entry wheel;
    rotating said graphical text entry wheel by way of a pointing device; and
    selecting at least one of said plurality of characters from said graphical text entry wheel, displaying a desired one of said plurality of characters within a character selection indicator prior to selecting said character with said pointing device, wherein said plurality of characters are arranged in a particular order on said graphical text entry wheel and said order is rearranged after one or more of said plurality of characters is selected to position most likely next characters to be selected in positions close to said one or more selected characters.

13. The method of claim 12, further comprising the step of displaying a suggested text window adjacent said graphical text entry wheel after one or more characters are selected, said suggested text window further comprising at least one suggested character string corresponding to said one or more selected characters.

14. The method of claim 13, further comprising the step of performing an additional predetermined function with said pointer to select one of said at least one suggested character string.

15. The method of claim 12, further comprising the step of providing a plurality of graphical text entry wheels, each of said graphical text entry wheels containing a different set of characters.

16. The method of claim 15, further comprising the step of performing a predetermined function with said pointer to shuffle through and select for display one of said plurality of graphical text entry wheels.

17. The method of claim 12, wherein said graphical text entry wheel is displayed in its entirety on said graphical text entry screen.

18. The method of claim 12, wherein only a portion of said graphical text entry wheel is displayed on said graphical text entry screen.

19. The method of claim 18, wherein said portion of said graphical text entry wheel is displayed in a lower corner of said graphical text entry screen.

20. The method of claim 18, wherein said portion of said graphical text entry wheel is displayed adjacent a top portion of said graphical text entry screen.

21. The method of claim 12, wherein said electronic device is a hand held electronic device.

22. The method of claim 21, wherein said electronic device is of a size sufficient to be held and said pointing device operated with the same hand of a user, thereby allowing for one handed operation and text entry.

23. A graphical text entry system, comprising:
a graphical text entry screen;
a graphical text entry wheel displayed on said graphical text entry screen;
a plurality of characters positioned on said graphical text entry wheel; and
pointing means for rotating said graphical text entry wheel, character selection indicator means positioned on said graphical text entry wheel, said pointing means being operable to select a character indicated by said character selection indicator means,
wherein said plurality of characters are arranged in a particular order on said graphical text entry wheel and said order is rearranged after one or more of said plurality of characters is selected to position most likely next characters to be selected in positions close to said one or more selected characters.

24. The system of claim 23, wherein said pointing means is operable to rotate said displayed graphical text input wheel.

25. The system of claim 24, further comprising a suggested text means displayed adjacent said graphical text entry wheel after one or more characters are selected, said suggested text means further comprising at least one suggested character string corresponding to said one or more selected characters.

26. The system of claim 23, further comprising:
a plurality of graphical text entry wheels; and
graphical text entry wheel selection means for shuffling through and selecting for display one of said plurality of graphical text entry wheels.

27. The system of claim 26, wherein each of said plurality of graphical text entry wheels contains a different set of characters.

28. The system of claim 23, wherein said graphical text entry system is included in a hand held electronic device.

29. The system of claim 28 wherein said hand held electronic device is of a size sufficient to be held and said pointing device operated by a user with the same hand.

* * * * *